United States Patent [19]
Klinzing et al.

[11] Patent Number: 5,252,007
[45] Date of Patent: Oct. 12, 1993

[54] APPARATUS FOR FACILITATING SOLIDS TRANSPORT IN A PNEUMATIC CONVEYING LINE AND ASSOCIATED METHOD

[75] Inventors: George E. Klinzing, Pittsburgh, Pa.; Shrikant Dhodapkar, Midland, Mich.

[73] Assignee: University of Pittsburgh of the Commonwealth System of Higher Education, Pittsburgh, Pa.

[21] Appl. No.: 878,400

[22] Filed: May 4, 1992

[51] Int. Cl.$^5$ .................. B65G 53/66; B65G 53/52
[52] U.S. Cl. .................................. 406/14; 406/89; 406/93; 406/94; 406/191; 406/193
[58] Field of Search .............. 406/10, 12, 14, 45, 406/89, 93, 94, 95, 151, 168, 171, 172, 191, 193

[56] References Cited

U.S. PATENT DOCUMENTS

| | | | |
|---|---|---|---|
| 4,083,607 | 4/1978 | Mott | 406/171 |
| 4,704,054 | 11/1987 | Rakowicz et al. | 406/28 |
| 4,859,120 | 8/1989 | Tsubata et al. | 406/84 |

Primary Examiner—David M. Mitchell
Assistant Examiner—Andrew C. Pike
Attorney, Agent, or Firm—Arnold B. Silverman; Suzanne Kikel

[57] ABSTRACT

An apparatus for facilitating solids transport in a pneumatic conveying line. The apparatus reduces the velocity of a gas within the pneumatic conveying line. The following describes a preferred embodiment. An inner cylinder is spliced into the line. An upper portion of the inner cylinder is made of a porous material. An outer cylinder having a diameter larger than the inner cylinder encircles the inner cylinder and defines a cavity therebetween. Two solenoid valves are associated with the outer cylinder; one for purging the gas and the other for introducing a reverse jet of gas to dislodge particles from the porous material. A pressure transducer measures fluctuations across the top of the inner cylinder and is connected to a control unit which, in turn, controls the valves.

25 Claims, 1 Drawing Sheet

APPARATUS FOR FACILITATING SOLIDS TRANSPORT IN A PNEUMATIC CONVEYING LINE AND ASSOCIATED METHOD

BACKGROUND OF THE INVENTION

1. Field Of The Invention

This invention relates to an apparatus and an associated method for facilitating solids transport in a pneumatic conveying line.

2. Description Of The Prior Art

Pneumatic conveying lines employ gas to move solids through an enclosed pathway, usually a pipeline. A problem associated with the transport of certain solids by means of pneumatic conveying lines is particle degradation.

It has been known that reducing gas velocity creates more favorable conditions for solids transport. Low velocity conveying not only reduces particle degradation, but also results in lower power requirements.

One known method of reducing gas velocity is to increase the cross-sectional area of the pneumatic conveying line. "Stepped" pneumatic conveying lines abruptly increase in cross-sectional area at periodic intervals. Unfortunately, every increase in the cross-sectional area of the pneumatic conveying line also increases costs.

Another method of reducing gas velocity is to reduce the fluid flow rate. The present invention accomplishes this by purging gas from the pneumatic conveying line.

The method of drawing air out of a pneumatic conveying line has been used to perform several functions. U.S. Pat. No. 4,859,120 discloses a pneumatic conveying system. A stall device is interposed between the ejector and the outlet side of the transporting piping, and includes a suction portion, formed by providing a multiplicity of air vents on the transporting piping, and an exhaust fan. The exhaust fan is driven such that the exhaust air flow rate becomes higher than the flow rate of the conveying wind power from the ejector whereby atmosphere is allowed to flow into the suction portion from the outlet of the transporting pipe. The flow of this atmospheric wind becomes counter flow wind against the articles conveyed.

U.S. Pat. No. 4,083,607 discloses a gas transport system for powder. A delivery pipe has an end portion of porous material having a pore size smaller than the particles of the powder. The porous end portion is surrounded by a jacket in which a vacuum is drawn to draw off transport gas and reduce filter capacity which would otherwise be required to remove it.

U.S. Pat. No. 4,704,054 discloses a tobacco discharge unit for the hopper of a continuous-rod cigarette making machine. Air from a pneumatic conveying line passes through a screen separating upper and lower compartments of the unit and out an outlet in the upper compartment. Tobacco distributing means prevent excessive packing.

In spite of the foregoing known systems, there remains a need for a device which reduces particle degradation and power requirements in pneumatic conveying lines, which eliminates the need for stepped pneumatic conveying lines and which is economical and easy to retrofit into existing systems.

SUMMARY OF THE INVENTION

The present invention has met the above described needs. The invention replaces a segment of pneumatic conveying line. An inner enclosure which has a central passage is spliced into the pneumatic conveying line so as to become part of the pneumatic conveying line. The inner enclosure is totally or partially made of suitable porous material. The inner enclosure may generally correspond to the shape and cross-sectional dimensions of the pneumatic conveying line.

An outer enclosure, which also has a central passage and which has a larger diameter than the inner enclosure, surrounds the inner enclosure to define a cavity between the two enclosures.

Gas purging means for purging gas from the pneumatic conveying line are attached to and operatively associated with the outer enclosure. The pores of the inner enclosure allow gas to be drawn from the inner enclosure by the gas purging means, while restricting the passage of solids from the inner enclosure to the outer enclosure.

Pressure measuring means are attached to and operatively associated with the inner and outer enclosures to measure pressure fluctuations across the porous material of the inner enclosure.

The gas purging means and the pressure measuring means are operatively connected to a control unit. The control unit receives data from the pressure measuring means and controls the amount of gas which is purged through the gas purging means.

In one embodiment of the present invention, reverse gas jet means for introducing reverse jets of gas against the porous material of the inner enclosure are attached to and operatively associated with the outer enclosure. The reverse jets of gas force any solids which are adhering to the porous material of the inner enclosure back into the pneumatic flow.

The reverse gas jet means are operatively connected to the control unit. The control unit controls the timing and duration of the reverse jets of gas which are introduced by the reverse gas jet means.

The present invention reduces particle degradation and power requirements in a pneumatic conveying line by reducing gas velocity and solid velocity within the pneumatic conveying line. The fluid velocity of the gas is reduced by reducing the fluid flow rate of the gas. Total fluid flow rate $Q_{total}$ is equal to the fluid flow rate of the gas being purged $Q_{purge}$ plus the fluid flow rate of the gas being conveyed $Q_{conveying}$.

$$Q_{total} = Q_{purge} + Q_{conveying}$$

The control unit controls $Q_{purge}$ by maintaining a corresponding pressure drop across the porous material of the inner enclosure. A specific standard pressure drop corresponds to a given flow rate. The value of $Q_{purge}$ is chosen by the control unit from its extensive database memory based on the saltation and pickup velocities of the solids being transported.

When the invention includes reverse gas jet means, the timing of the reverse jets of gas is chosen by the control unit based on the size and properties of the solids being transported and on the particular porous material which is being used in the inner cylinder. The purging of gas from the pneumatic conveying line stops momentarily during introduction of a reverse jet of gas by the reverse gas jet means.

The present invention is operable in pneumatic conveying lines with total fluid flow rates $Q_{total}$ of from about 250 SCFM to 5000 SCFM and preferable of about 1000 SCFM to 4000 SCFM.

One or more units of the present invention may be employed in a given pneumatic conveying line.

It is an object of the present invention to provide a device that facilitates solids transport in a pneumatic conveying line.

It is another object of the present invention to provide such a device which reduces fluid flow rate through a pressure drop created by purging gas from the pneumatic conveying line.

It is another object of the present invention to provide such a device which reduces particle degradation, saltation and conveying line power requirements and which eliminates the need for stepped pneumatic conveying lines.

It is another object of the present invention to provide such a device which is economical and easy to retrofit into existing systems.

It is another object of the present invention to provide such a device which is useful for pneumatic transport of granular and powdery material alike.

It is another object of the present invention to provide a method of facilitating solids transport in a pneumatic conveying line.

These and other objects of the present invention will be more fully understood due to the following detailed description of the preferred embodiments on reference to illustrations appended hereto.

DESCRIPTION OF THE PREFERRED EMBODIMENTS

Figure 1:
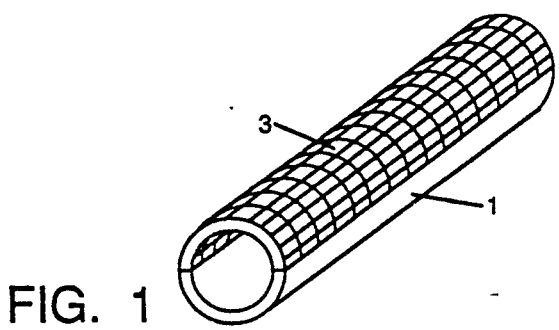
FIG. 1 is a perspective view of the preferred form of the inner cylinder of the present invention.

In its preferred form, the present invention includes a cylindrical enclosure. The enclosure is made up of a hollow inner cylinder and a hollow outer cylinder surrounding the inner cylinder. A preferred form of the inner cylinder is shown in FIG. 1. The inner cylinder is preferably made up of two halves—a solid bottom half 1 and a porous top half 3. The solid bottom half 1 may be made of any material having sufficient integrity to maintain the cylindrical form. The solid bottom half 1 may be of any wall thickness as long as the structural integrity of the cylinder is preserved. The porous top half 3 may be made of any porous material having sufficient integrity to maintain the cylindrical form and is preferably DYNAPOR™, which is a trademark for a fluidizing media made by Michigan Dynamics, Inc. of Garden City, Mich. The porous top half 3 may have a wall thickness of from about 0.0035 inches to 0.032 inches and preferably about 0.005 inches to 0.03 inches. The pore size of the porous material may be from about 1 micrometer to 100 micrometers and is preferably about 10 micrometers to 100 micrometers. The pore size should be smaller than the finest particle being conveyed. The top half 3 and bottom half 1 of the inner cylinder may be connected by welding or other methods of pre-fabrication.

Figure 2:
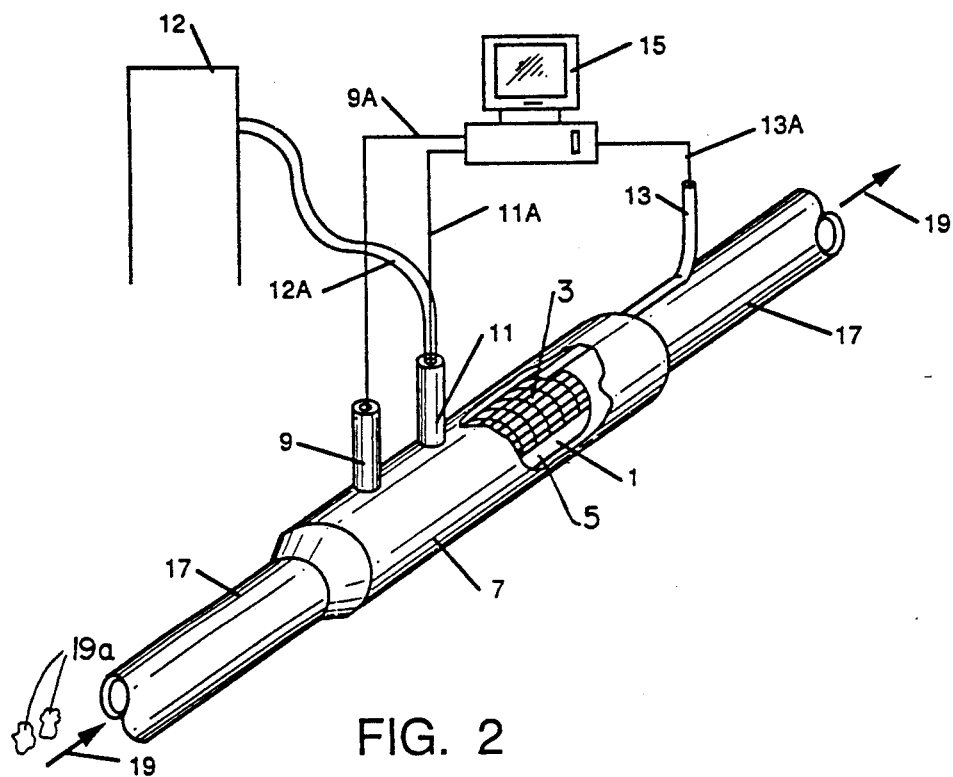
FIG. 2 is a partly broken away perspective view of the preferred form of the present invention in a pneumatic pipeline.

As shown in FIG. 2, the preferred form of the invention replaces a segment of pneumatic pipeline. The inner cylinder 5 is spliced into the pneumatic pipeline 17 so as to become part of the pneumatic pipeline 17. The inner cylinder 5 is from about 1 foot to 12 feet in length and preferably about 2 feet to 6 feet in length. The diameter of the inner cylinder 5 is from about 2 inches to 12 inches and preferably about 4 inches to 10 inches and equals the diameter of the pipeline 17 into which the inner cylinder 5 is spliced. The outer cylinder 7 is of slightly larger diameter than the inner cylinder 5, and surrounds the inner cylinder 5. The diameter of the outer cylinder 7 is from about 3 inches to 14 inches and preferably about 5 inches to 11 inches. The outer cylinder 7 should be about 1 inch larger in diameter than the inner cylinder 5. The outer cylinder 7 is about the same length as the inner cylinder 5. The length of the inner cylinder 5 and outer cylinder 7 is directly related to the percentage of gas purge desired.

In the preferred form of the present invention, a valve 9 for purging gas from the pneumatic conveying line and a valve 11, for introducing a reverse jet of gas against the porous top half 3 of the inner cylinder 5 are secured to and operatively associated with the outer cylinder 7. Both valves 9 and 11 are preferably solenoid valves. Valve 9 may open directly to the atmosphere while valve 11 is operatively associated with a high pressure gas source 12 through suitable rigid tubing 12A. The tubing 12A is preferably copper. The valves 9 and 11 are connected to a control unit 15 through suitable connectors 9A and 11A. The connectors 9A and 11A may be pneumatic tubes or suitable electric conductors and are preferably electric conductors. The control unit 15 opens valve 9 or valve 11 completely and closes the remaining valve completely, depending on whether gas is to be purged or a reverse jet of gas is to be introduced. The control unit 15 is preferably a computer which uses fuzzy logic.

A pressure transducer 13 for measuring pressure fluctuations across the porous top half 3 of the inner cylinder 5 is operatively associated with the inner cylinder 5 and the outer cylinder 7 and is operatively connected to the control unit 15 through a suitable connector 13A. Connector 13A is preferably a suitable electric conductor.

Figure 3:
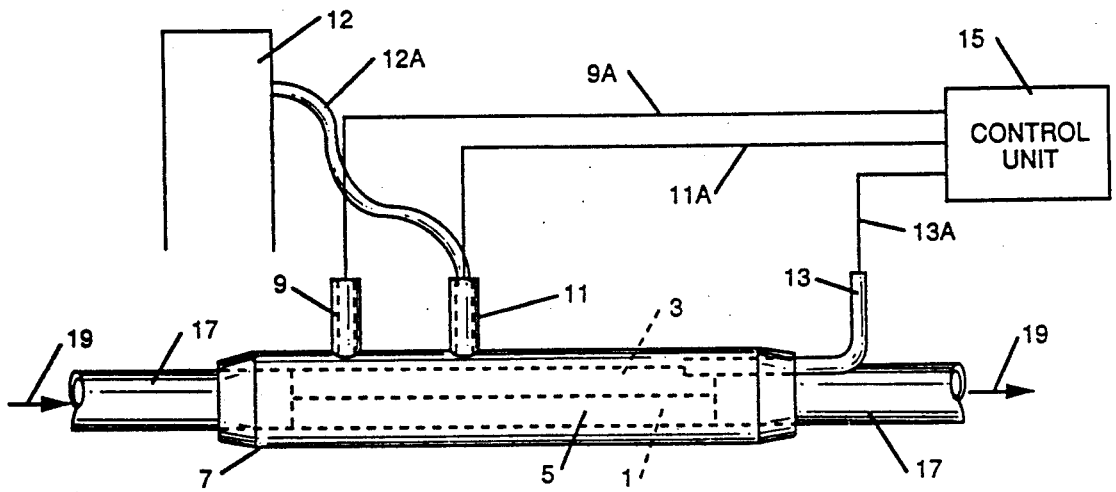
FIG. 3 is a schematic illustration of the preferred form of the present invention.

As illustrated schematically in FIG. 3, the present invention operates as follows. Gas and solids 19 travel along the pneumatic pipeline 17. In the inventions preferred use, the solids 19 consist of granular or powdery particles such as, for example, coal, grain, cement, food stuffs, plastic particles or minerals. The percentage of solids 19 volume to gas volume may range from about less than 1% to 10%. The control unit 15 selects a specific value for $Q_{purge}$ based on the saltation and pickup velocities of the solids 19 being transported. The pressure transducer 13 measures pressure fluctuations occurring across the porous top half 3 of the inner cylinder 5. This information is sent through connector 13A to the control unit 15. The control unit 15, via connector 9A, controls the purging of gas through valve 9 so as to maintain a specific pressure drop across the porous top half 3 of the inner cylinder 5 which corresponds to the chosen value of $Q_{purge}$. As gas and solids 19 pass through the invention, the pressure drop results in a $Q_{purge}$, which in turn results in a lower $Q_{total}$. This reduction in fluid flow rate reduces fluid velocity. The reduction in fluid velocity reduces particle degradation of the solids 19 being transported and power requirements of the pneumatic conveying system. The gas and solids 19 may include particles 19a as shown in FIG. 2.

By purging gas through the porous top half 3 of the inner cylinder 5, a vertical component of gas velocity is created. This adds an additional lift to the solids 19 being transported, which have a tendency to settle down under the influence of gravity due to the reduction in fluid velocity. In this way the preferred, halved design of inner cylinder 5 resists saltation. At the same time, the porous material on the porous top half 3 of the inner cylinder 5 restricts the passage of particles from the inner cylinder 5 to the outer cylinder 7.

At desired time intervals, a reverse jet of gas is introduced from high pressure gas source 12 via tubing 12A by valve 11 against the porous top half 3 of inner cylinder 5. The valve 11 opens suddenly, and simultaneously valve 9 closes suddenly. Opening valve 11 forms a gas jet and a sudden rise in pressure in the outer cylinder 17 which causes many small gas jets to form in the pores of the porous top half 3 of the inner cylinder 5. These jets of gas force any solids 19 which may be blocking the pores of the porous top half 3 of inner cylinder 5 back into the pneumatic flow. The timing of the reverse jets of gas through valve 11 is controlled by control unit 15 via connector 11A. The timing of the reverse jets of gas through valve 11 is calculated by the control unit 15 based on the size and properties of the solids 19 being transported and on the particular porous material of the porous top half 3 of the inner cylinder 5. In its preferred form, the control unit 15 uses fuzzy logic to compensate for the fuzziness of the input variable.

The following example is given for the purpose of illustrating this invention and is not intended as a limitation thereof.

EXAMPLE 20,000 pounds per hour of coal are to be transported 1500 feet in horizontal distance. The coal has a top size of 0.5 millimeters in diameter and a bottom size of 25 micrometers. The pipeline is 8 inches in size with 1000 SCFM of gas employed in the transport. The present invention is inserted into the pipeline at 850 feet from the beginning of the pipeline. The invention includes an inner cylinder having a diameter of 8 inches and an outer cylinder having a diameter of 9 inches. The inner and outer cylinders are 8 inches in length. The porous top half of the inner cylinder is made of DYNAPOR ™ which is a trademark for a fluidizing media sold by Michigan Dynamics, Inc. of Garden City, Mich. and having a flow rate of 1 SCFM/in$^2$ at 0.1 psid. The invention removes about 10% of the transport gas. The invention reduces particle attrition, pipe erosion and energy requirements.

It will be appreciated that an apparatus for facilitating solids transport in a pneumatic conveying line and an associated method have been disclosed.

Whereas particular embodiments of the invention have been described hereinabove, for purposes of illustration, it will be evident to those skilled in the art that numerous variations of the details may be made without departing from the invention as defined in the appended claims.

What is claimed is:

1. An apparatus for facilitating solids transport in a pneumatic conveying line, comprising:
   an inner enclosure having a portion made of porous material and having a central passage and being spliced into said pneumatic conveying line so as to become part of said pneumatic conveying line;
   an outer enclosure being of greater diameter than said inner enclosure and having a central passage which surrounds said inner enclosure to define a cavity therebetween;
   gas purging means attached to and operatively associated with said outer enclosure for the controlled purging of gas from said pneumatic conveying line;
   pressure measuring means attached to and operatively associated with said inner and outer enclosures for measuring pressure fluctuations across said porous material of said inner enclosure and
   a control unit, operatively connected to said gas purging means and to said pressure measuring means, for controlling the purging of the gas from said pneumatic conveying line.

2. The apparatus of claim 1, further comprising:
   reverse gas jet means, attached to and operatively associated with said outer enclosure and operatively connected to said control unit for introducing reverse jets of gas against said porous material of said inner enclosure, the timing of said reverse jets of gas being controlled by said control unit.

3. The apparatus of claim 2, wherein
   said inner enclosure generally corresponds to the shape and cross-sectional dimensions of said pneumatic conveying line.

4. The apparatus of claim 3, wherein
   said inner and outer enclosures are cylinders.

5. The apparatus of claim 4, wherein
   said inner cylinder consists of two halves: a bottom half having a solid wall, and a top half having a wall made of suitable said porous material.

6. The apparatus of claim 5, wherein
   said top half of said inner cylinder is a fluidizing media.

7. The apparatus of claim 6, wherein
   said control unit is a computer which uses fuzzy logic.

8. The apparatus of claim 7, wherein
   said gas purging means includes a valve and said reverse gas jet means include a valve and a high pressure gas source.

9. The apparatus of claim 8, wherein
   said porous material contains pores which are from about 1 micrometer to 100 micrometers in size.

10. The apparatus of claim 8, wherein
    the length of said inner cylinder is from about 1 foot to 12 feet.

11. The apparatus of claim 8, wherein
    the diameter of said inner cylinder is front about 2 inches to 12 inches.

12. A method of facilitating solids transport in a pneumatic conveying line wherein said solids are transported by a stream of pneumatic gas which comprises the steps of:
    (a) splicing an inner enclosure having a portion made of porous material and having a central passage into said pneumatic conveying line so as to become part of said pneumatic conveying line;
    (b) positioning an outer enclosure with a greater diameter than said inner enclosure around said inner enclosure to define a cavity therebetween;
    (c) connecting gas purging means to said outer enclosure for the controlled purging of gas from said pneumatic conveying line;
    (d) connecting pressure measuring means to said inner and outer enclosures for measuring pressure fluctuations across said porous material of said inner enclosure;

(e) connecting a control unit to said gas purging means and to said pressure measuring means for controlling the purging of the gas from said pneumatic conveying line; and (f) after completing steps (a) through (e), transporting said solids through said pneumatic conveying line and simultaneously operating said gas purging means, said pressure measuring means, and said control unit for said controlling of said purging of said gas of said pneumatic flow.

13. The method of claim 12, further comprising while performing step (f), introducing reverse jets of gas against said porous material of said inner enclosure to force any solids which may be blocking the pores of said porous material back into said pneumatic flow, and controlling the timing of the introduction of said reverse jets of gas by said control unit.

14. The method of claim 13, further comprising employing said inner enclosure with a shape and cross-section which generally corresponds to the shape and cross-sectional dimensions of said pneumatic conveying line.

15. The method of claim 14, further comprising employing generally cylindrical said inner and outer enclosures.

16. The method of claim 15, further comprising employing as said inner enclosure an enclosure having a bottom half having a solid wall, and a top half having a wall made of suitable said porous material.

17. The method of claim 16, further comprising employing in said top half of said inner cylinder a fluidizing media for said porous material.

18. The method of claim 17, further comprising employing a computer which uses fuzzy logic as said control unit.

19. The method of claim 18, further comprising employing in said gas purging means a valve, and employing in said reverse gas jet means a valve and a high pressure gas source.

20. The method of claim 19, further comprising employing said fluidizing media with pores which are from about 1 micrometer to 100 micrometers.

21. The method of claim 19, further comprising employing as said inner cylinder a cylinder that is about 1 foot to 12 feet long.

22. The method of claim 19, further comprising employing as said inner cylinder a cylinder that is about 2 inches to 12 inches in diameter.

23. The method of claim 19, further comprising employing said method to process solids that are particles.

24. The method of claim 23, further comprising employing said method to process said particles which are at a volume ratio to said pneumatic gas of about less than 1% to 10%.

25. The method of claim 19, further comprising employing in said pneumatic conveying line at least one unit of said apparatus.

* * * * *